US010735366B2

(12) United States Patent
Yu et al.

(10) Patent No.: US 10,735,366 B2
(45) Date of Patent: Aug. 4, 2020

(54) METHOD AND APPARATUS FOR PROVIDING A MESSAGE NOTIFICATION SERVICE BASED ON SPATIAL INFORMATION

(71) Applicant: LIZEN COMPANY, Seoul (KR)

(72) Inventors: Tae Min Yu, Seoul (KR); Seung Chul Han, Seoul (KR)

(73) Assignee: LIZEN COMPANY, Seoul (KR)

( * ) Notice: Subject to any disclaimer, the term of this patent is extended or adjusted under 35 U.S.C. 154(b) by 61 days.

(21) Appl. No.: 15/783,364

(22) Filed: Oct. 13, 2017

(65) Prior Publication Data

US 2019/0116146 A1   Apr. 18, 2019

(51) Int. Cl.
*H04L 12/58* (2006.01)
*H04L 29/08* (2006.01)

(52) U.S. Cl.
CPC .............. *H04L 51/24* (2013.01); *H04L 51/32* (2013.01); *H04L 67/1044* (2013.01); *H04L 51/20* (2013.01); *H04L 67/18* (2013.01); *H04L 67/26* (2013.01)

(58) Field of Classification Search
None
See application file for complete search history.

(56) References Cited

U.S. PATENT DOCUMENTS

| | | | | |
|---|---|---|---|---|
| 6,351,745 B1* | 2/2002 | Itakura | ................. | G06F 3/1423 |
| 7,921,174 B1* | 4/2011 | Denise | ................. | G06Q 10/107 |
| | | | | 709/206 |
| 2002/0042846 A1* | 4/2002 | Bottan | ................. | H04L 29/06 |
| | | | | 709/249 |
| 2002/0102967 A1* | 8/2002 | Chang | ................. | G06Q 30/0601 |
| | | | | 455/414.1 |
| 2002/0107950 A1* | 8/2002 | Lu | ................. | G06Q 10/107 |
| | | | | 709/223 |
| 2007/0027978 A1* | 2/2007 | Burkman | ................. | H04L 29/06 |
| | | | | 709/224 |
| 2008/0291022 A1* | 11/2008 | Amador | ................. | G06Q 30/02 |
| | | | | 340/572.1 |
| 2012/0079045 A1* | 3/2012 | Plotkin | ................. | H04L 51/12 |
| | | | | 709/206 |
| 2013/0103747 A1* | 4/2013 | Mizuki | ................. | A63F 13/87 |
| | | | | 709/203 |
| 2013/0339453 A1* | 12/2013 | Aggarwal | ................. | H04L 51/20 |
| | | | | 709/206 |
| 2014/0379813 A1* | 12/2014 | Charania | ................. | H04L 51/02 |
| | | | | 709/206 |

* cited by examiner

*Primary Examiner* — Scott B Christensen (74) *Attorney, Agent, or Firm* — Nelson Mullins Riley & Scarborough LLP; Kongsik Kim, Esq.

(57) ABSTRACT

A method and an apparatus for providing a message notification service based on spatial information are disclosed. A method for providing a message notification service from a server may include: receiving current circumstance information from a user terminal; if there exists a notification condition matching the current circumstance information, then extracting the message corresponding to the notification condition that matches the current circumstance information; and transmitting the extracted message to the user terminal.

8 Claims, 7 Drawing Sheets

METHOD AND APPARATUS FOR PROVIDING A MESSAGE NOTIFICATION SERVICE BASED ON SPATIAL INFORMATION

TECHNICAL FIELD

The present invention relates to a method and an apparatus for providing a message notification service based on spatial information.

RELATED ART

A social networking service (SNS), such as Facebook, Twitter, and Foursquare, generally connect friends and social acquaintances and allow the connected friends to easily exchange messages. An existing SNS such as the above may be suitable for quickly propagating new stories among friends.

However, the existing SNS does not allow the user to search new stories concerning a particular current circumstance, such as in regard to the space in which the user is located; neither does the existing SNS select and provide such stories.

SUMMARY OF THE INVENTION

An objective of the invention is to provide a method and an apparatus for providing a message notification service based on spatial information.

Another objective of the invention is to provide a method and an apparatus for providing a message notification service based on spatial information, where a message configured to have a notification condition, including at least spatial information, may be registered on a bulletin board or comment, and the message can be provided to a user in real time if the user's current circumstance matches the notification condition.

A first aspect of the present invention provides a method for providing a message notification service based on spatial information.

A first disclosed embodiment of the invention can provide a method for providing a message notification service from a server, where the method can include: receiving current circumstance information from a user terminal; if there exists a notification condition matching the current circumstance information, then extracting the message corresponding to the notification condition that matches the current circumstance information; and transmitting the extracted message to the user terminal.

The current circumstance information may include at least two or more of spatial or location information, time information, direction information, inclination information associated with a user manipulation of the user terminal, speed information, applied gravity, illuminance, temperature, atmospheric pressure, and health or biometric information.

The operation of extracting the message can include extracting a message configured to have a notification condition matching the current circumstance information from among messages that were newly registered within a particular time.

The operation of extracting the message can entail excluding messages that were previously extracted and transmitted, from among the extracted messages.

The method can further include storing the identification information of the user terminal to which the message is transmitted or storing the number of transmissions of the message, after the operation of transmitting the extracted message, with the identification information or the number of transmissions stored in correspondence with the message. In this case, extracting the message can include repeatedly extracting the message configured to have a notification condition matching the current circumstance information from among the messages newly registered within a particular time, if the user terminal from which the current circumstance information is received is not the user terminal to which the message is transmitted or if the number of transmissions of the message is within a preset number of transmissions.

The method can further include receiving and registering a message including a notification condition from a registry-permitted user terminal, before receiving the current circumstance information.

It is possible for the registry-permitted user terminal and the user terminal to be the same terminal.

A second disclosed embodiment of the invention can provide a method for receiving a message notification service at a user terminal, where the method can include: receiving messages and notification conditions corresponding to the messages from a server; acquiring current circumstance information of the user terminal or a user; and, if there exists a notification condition matching the current circumstance information, selecting and outputting a message corresponding to the notification condition that matches the current circumstance information.

The method can further include, after the selecting and outputting of the message, deleting the selected message and the notification condition corresponding to the selected message.

The operation of receiving the messages and the notification conditions corresponding to the messages can include receiving the messages and the notification conditions corresponding to the messages periodically or non-periodically, and a message that is not selected for a particular duration from among the received messages can be deleted, together with the notification condition, after the particular duration passes.

A second aspect of the present invention provides an apparatus for providing a message notification service based on spatial information.

A first disclosed embodiment of the invention can provide a server that provides a message notification service, where the server can include: a receiver unit configured to receive current circumstance information from a user terminal; an extraction unit configured to extract a message corresponding to a notification condition matching the current circumstance information if such a notification condition matching the current circumstance information exists; and a transmitter unit configured to transmit the extracted message to the user terminal.

A registry unit can be further included, which may be configured to receive and register messages including notification conditions from registry-permitted user terminals.

A second disclosed embodiment of the invention can provide a user terminal configured to receive a message notification service, where the user terminal can include: a sensor; a communication unit configured to receive a message and a notification condition corresponding to the message from a server; an acquisition unit configured to acquire current circumstance information of the user terminal or a user by way of the sensor; and a display unit configured to select and output a message corresponding to a notification condition matching the current circumstance information, if such a notification condition matching the current circumstance information exists.

The sensor can include at least one of a GPS device, a gyroscope, an acceleration sensor, a digital compass, a time sensor, a temperature sensor, an illuminance sensor, an altitude sensor, an atmospheric pressure sensor, and a sensor for acquiring biometric information, while the notification condition and the current circumstance information can include at least one of spatial or location information, time information, direction information, inclination information associated with a user manipulation of the user terminal, speed information, applied gravity, illuminance, temperature, atmospheric pressure, and health or biometric information.

With a method and an apparatus for providing a message notification service based on spatial information according to an embodiment of the invention, a message configured to have a notification condition that includes at least spatial information may be registered on a bulletin board or comment, and the message can be provided to a user in real time if the user's current circumstance matches the notification condition.

Additional aspects and advantages of the present invention will be set forth in part in the description which follows, and in part will be obvious from the description, or may be learned by practice of the invention.

DETAILED DESCRIPTION OF THE INVENTION

As the invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In the description of the present invention, certain detailed explanations of related art are omitted if it is deemed that they may unnecessarily obscure the essence of the invention.

While such terms as "first" and "second," etc., may be used to describe various components, such components must not be limited to the above terms. The above terms are used only to distinguish one component from another.

The terms used in the present specification are merely used to describe particular embodiments, and are not intended to limit the present invention. An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

The present invention relates to a method by which a message configured to have a notification condition that includes at least spatial information can be registered on a bulletin board or comment, and the message can be provided to a user in real time if the user's current circumstance matches the notification condition.

Certain embodiments of the invention are described below in more detail with reference to the accompanying drawings.

Figure 1:
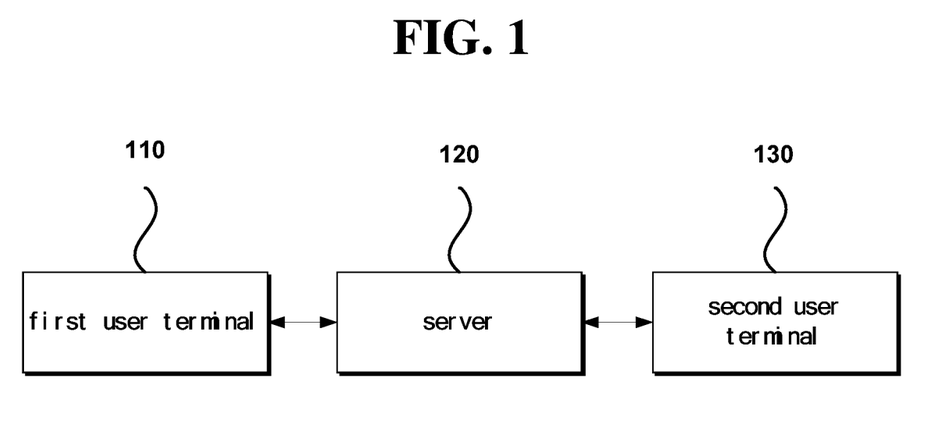
FIG. 1 is a diagram conceptually illustrating the composition of a system for providing a message notification service based on spatial information according to a first disclosed embodiment of the invention.

FIG. 1 is a diagram conceptually illustrating the composition of a system for providing a message notification service based on spatial information according to a first disclosed embodiment of the invention.

As illustrated in FIG. 1, a system according to the first disclosed embodiment of the invention may include a first user terminal 110, a second user terminal 130, and a server 120.

In the description of the first disclosed embodiment, the terminal carried by the user who is registering a message that includes a notification condition including spatial information is referred to as the first user terminal 110, for the sake of better understanding and easier explanation.

Also, the terminal carried by the user who receives a notification or a message associated with a notification condition registered on a bulletin board or comment is referred to as the second user terminal 130.

According to the first disclosed embodiment, the user who registers a message configured to have a notification condition including at least spatial information can be the same person as the user who receives a notification service or message associated with a notification condition within a particular space.

Therefore, the first user terminal 110 and the second user terminal 130 can be the same user terminal carried by the same user or can be different user terminals.

The first user terminal 110 may be a device for registering a message including a notification condition to a server 120.

In one example, the first user terminal 110 can receive a message as input from a user, receive a notification condition corresponding with the message as direct input or a setting configuration, and then register the notification condition and the message to the server 120. Here, the message can be multimedia data that includes text, image, voice, picture or video data.

The notification condition can include at least one of a space condition, time condition, and circumstance condition. Also, the notification condition can include at least the space condition.

The space condition can be location information and can include, for example, at least one of a longitude, a latitude, an altitude, an address, and a region (e.g. city, town, village, county, region of interest, location, etc.).

Also, the time condition can include year, month, day, and/or time.

The circumstance condition can include at least one of direction, inclination, speed, applied gravity, illuminance, temperature, atmospheric pressure, health information, and biological or biometric information.

In one example, the first user terminal 110 can connect to the server 120, input a message and a notification condition through a web page provided by the server 120, and register to the server 120.

Here, the message and notification condition registered by the user can be, for example, on a particular bulletin board or a comment made to a particular message registered on a bulletin board. It is assumed here that the entities permitted to receive the notification service for a bulletin board post or comment were configured beforehand. According to the method of implementation, the entities permitted to receive the service can be members subscribed to a particular blog or forum or a selected group of such members.

Of course, according to the method of implementation, the entities permitted to receive the service can also be an unspecified public.

The second user terminal 130 may serve to periodically or non-periodically transmit current circumstance information of the user to the server 120 and receive a notification service from the server 120 in regard to a message associated with a notification condition that matches the current circumstance information.

In one example, the second user terminal 130 can collect the current circumstance information of the user or of the second user terminal 130 and periodically or non-periodically transmit the collected current circumstance information to the server 120. If a message that includes a notification condition matching the current circumstance information is registered on the bulletin board, the second user terminal 130 can receive the corresponding message as the server 120 extracts the message and provides it to the second user terminal 130. A more detailed description of this will be provided later on with reference to FIG. 3 or FIG. 4.

The server 120 may serve to provide a message notification service based on spatial information.

In one example, the server 120 can receive notification conditions and messages from first user terminals 110, register these on a bulletin board, and afterwards provide a message corresponding to a notification condition that matches the current circumstance of the user to the second user terminal 130.

In this way, the server 120 can provide connections not just between friends but with regard to notification conditions (e.g. spatial information, time) in an SNS and can send messages to user terminals that are under the same current circumstances as that of the notification condition.

A more detailed description of this is provided below with reference to FIG. 2 to FIG. 4.

Figure 2:
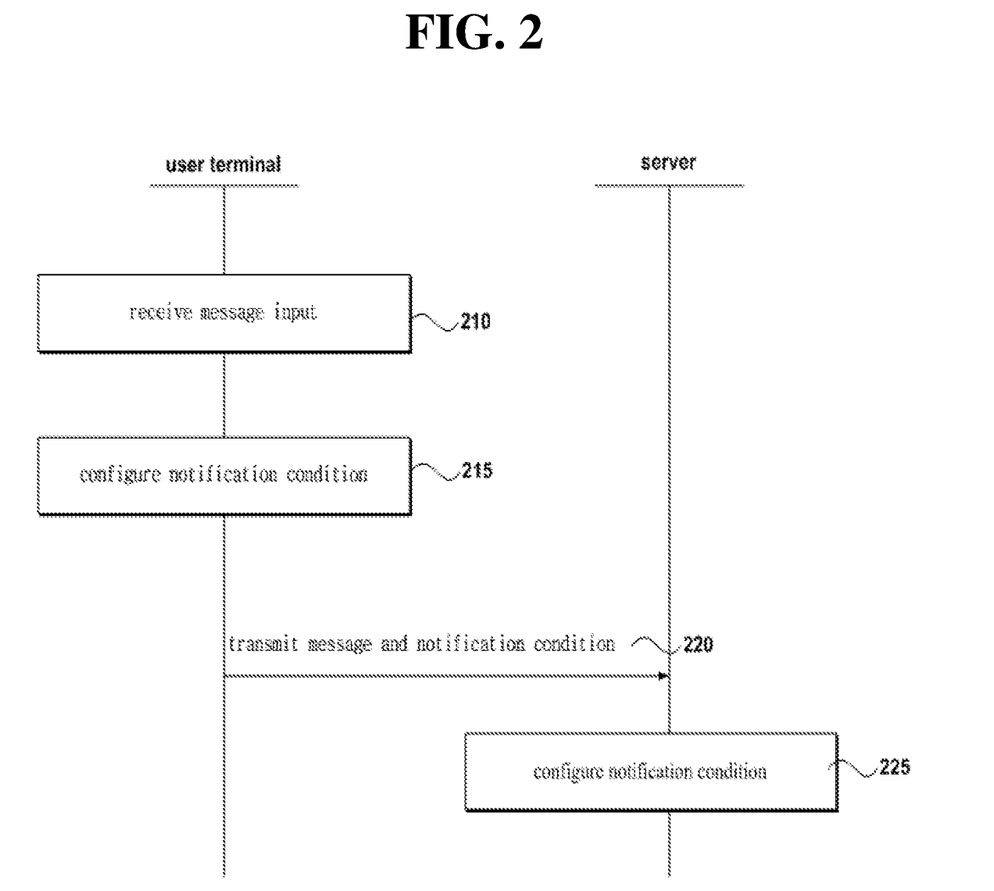
FIG. 2 is a flow diagram illustrating a method of registering a notification condition and a message to a server according to the first disclosed embodiment of the invention.

FIG. 2 is a flow diagram illustrating a method of registering a notification condition and a message to a server according to the first disclosed embodiment of the invention. In the following, it is supposed that the first user terminal 110 and the server 120 are connected and can communicate with each other. According to the method of implementation, the first user terminal 110 can be provided with an interface (e.g. web page) through which to register messages for the notification service from the server 120 and can receive input of the messages and notification conditions by way of the interface. In the descriptions that follow, it should be understood that the first user terminal 110 may receive the messages and notification conditions as input via an interface provided by the server 120, even if it is not thus specified in the descriptions.

Also, although the descriptions below suppose that users register the messages on a bulletin board for the sake of better understanding and easier explanation, the invention is not necessarily limited to bulletin boards and can obviously applied in like manner to posts and comments on blogs, SNS, etc.

In operation 210, the first user terminal 110 may receive a message that is to be registered on a bulletin board as input from the user.

In one example, the first user terminal 110 can receive input of the message that is to be registered on the bulletin board by way of an interface provided via the server 120.

In operation 215, the first user terminal 110 may receive the notification condition corresponding to the message as direct input or a setting configuration from the user. Here, the notification condition can include at least spatial information.

As described above, the notification condition can include at least one of a space condition, time condition, and circumstance condition. As this has already been described above, redundant descriptions are omitted here.

Also, the first user terminal 110 can further configure a continuance duration for maintaining the notification condition for a corresponding message.

In one example, the continuance duration can be configured as a date and time after the posting of the message or as a particular duration of time.

According to the method of implementation, it would also be possible not to set a separate continuance duration for maintaining the notification service for a message. In this case, the server 120 can determine whether or not to continue notification for a message by considering whether or not a message matching a notification condition has been transmitted, the number of times it was transmitted, and the like.

In operation 220, the first user terminal 110 may transmit the message and notification condition inputted by the user to the server 120.

In operation 225, the server 120 may register the message received from the first user terminal 110 to a bulletin board. Also, the server 120 may separately set a notification condition for the corresponding message.

Thus, the first user terminal 110 can register a message that is configured to have a notification condition onto a bulletin board of the server 120, and afterwards, a notification can be provided by way of a message set to have a notification condition matching the current circumstance of the user or user terminal.

Figure 3:
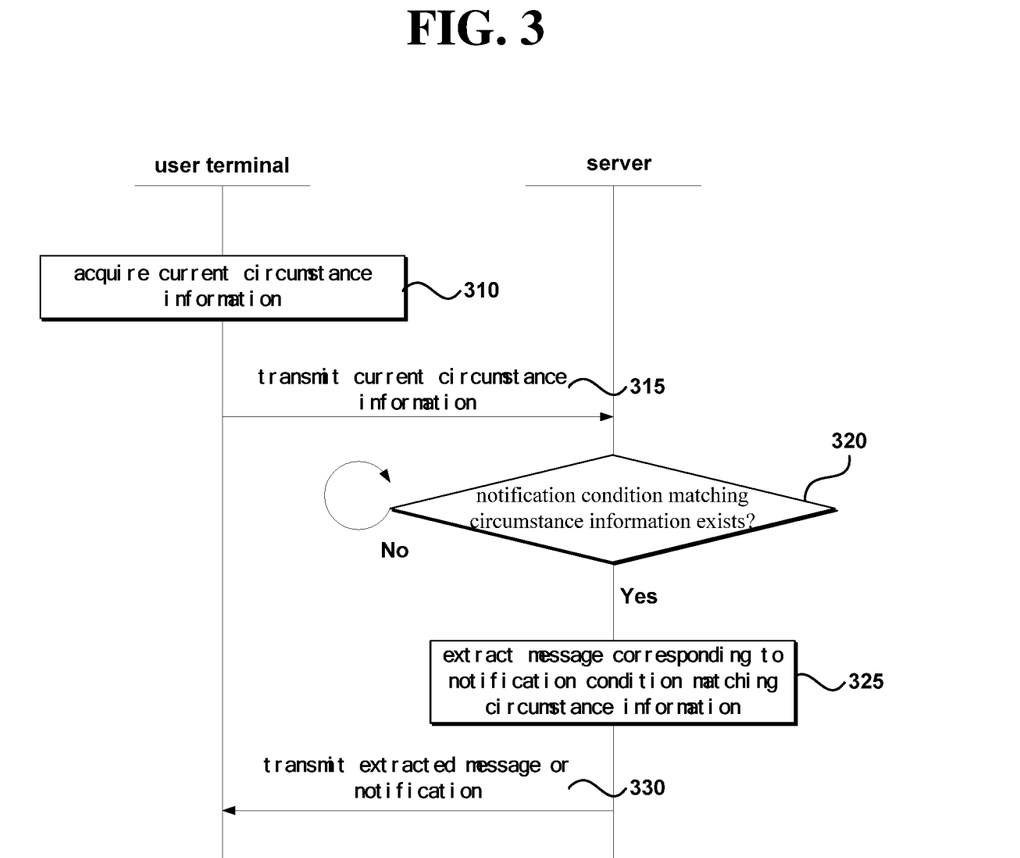
FIG. 3 is a flow diagram illustrating a method for providing a message notification service based on spatial information from a server according to the first disclosed embodiment of the invention.

FIG. 3 is a flow diagram illustrating a method for providing a message notification service based on spatial information from a server according to the first disclosed embodiment of the invention. Although the entity being provided with the message notification service is referred to in the descriptions as the first user terminal 130 for the sake of better understanding and easier explanation, it is obvious that said entity can also be the second user terminal.

In operation 310, the first user terminal 110 may collect the current circumstance information for the user or the second user terminal 110.

In one example, the first user terminal 110 can acquire spatial information regarding the space in which the first user terminal 110 is located (e.g. location information). Also, the first user terminal 110 can acquire information on at least one of the time, movement direction of the user, the inclination of the first user terminal 110, movement speed of the user, applied gravitational force, illuminance, current temperature, current atmospheric pressure, and health or biometrics of the user, besides the spatial information.

The movement direction of the user can be derived using the spatial information acquired over a certain duration of time. The movement speed can also be calculated by using the spatial information acquired over a certain duration of time. As the method of calculating the movement direction or movement speed based on multiple pieces of spatial information (location information) is apparent to the skilled person, a detailed description of this matter will not be provided here.

The inclination, applied gravity, illuminance, current temperature, current atmospheric pressure, etc., at the first user terminal 110 can be measured by using a separate sensor installed on the first user terminal 110.

Also, the health or biometric information of the user can also be measured by a separate sensor installed on the second user terminal 130.

According to the method of implementation, the health or biometric information of the user can first be measured by way of an external equipment and then inputted to the first user terminal 110.

In operation 315, the first user terminal 110 may transmit the acquired current circumstance information to the server 120.

In operation 320, the server 120 may determine whether or not there exists a notification condition that matches the current circumstance information received from the first user terminal 110.

If there is no notification condition matching the current circumstance information, then the flow may remain at operation 320.

However, if there is a notification condition that matches the current circumstance information, then in operation 325, the server 120 may extract the message (or notification) that corresponds to the notification condition matching the current circumstance information from the bulletin board. As described above, the message (or notification) can be a multimedia message.

In operation 330, the server 120 may transmit the extracted message or notification to the first user terminal 110.

In this way, the first user terminal 110 can register messages, which may be configured to have notification conditions, onto the bulletin board of the server 120, and later be provided with a notification, including a message set to have a notification condition matching the current circumstance of the user or user terminal.

The server 120 can transmit only the extracted message or can also generate a notification by using the extracted message and the notification condition and transmit the notification separately to the first user terminal 110.

Figure 4:
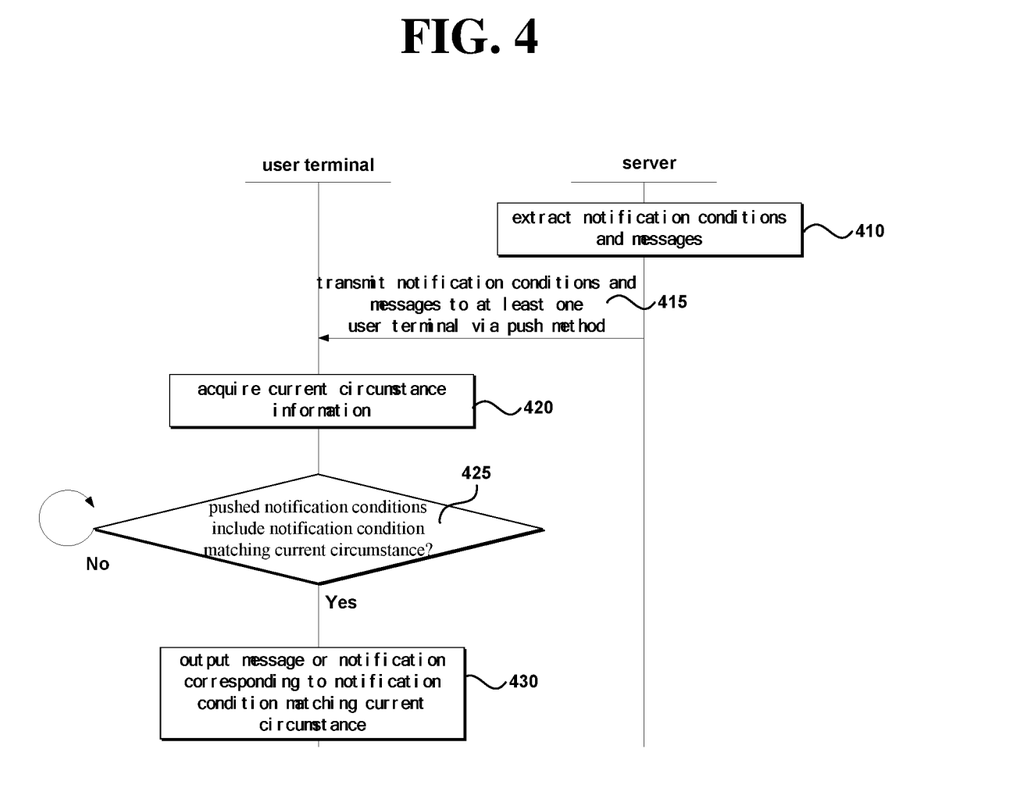
FIG. 4 is a flow diagram illustrating a method for providing a message notification service based on spatial information according to a second disclosed embodiment of the invention.

FIG. 4 is a flow diagram illustrating a method for providing a message notification service based on spatial information according to a second disclosed embodiment of the invention.

In operation 410, the server 120 may extract the messages and notification conditions registered on the bulletin board.

In one example, the server 120 can extract messages that have not been pushed and their corresponding notification conditions from the bulletin board, excluding those messages that have been pushed to the second user terminals 130 before.

In another example, the server 120 can also extract messages that have been newly registered within a particular duration from the current time, along with their notification conditions, from the bulletin board.

In operation 415, the server 120 may transmit the extracted messages and notification conditions to a multiple number of second user terminals 130. Here, the second user terminals 130 can be an unspecified public or can include specific user terminals that have subscribed beforehand.

In operation 420, the second user terminal 130 may acquire current circumstance information. As described above, the current circumstance information can include spatial information regarding where the second user terminal 130 is located (e.g. location information) and can include information on at least one of the time, movement direction of the user, the inclination of the second user terminal 130, movement speed of the user, applied gravitational force, illuminance, current temperature, current atmospheric pressure, and health or biometrics of the user.

In operation 425, the second user terminal 130 may determine whether or not there exists a notification condition that matches the current circumstance information from among the notification conditions received via the server 120.

If there is no matching notification condition, then the flow may proceed to operation 420.

If there is no notification condition matching the current circumstance information at a particular time or during a particular duration of time, the second user terminal 130 can delete the messages and notification conditions received from the server 120.

However, if there does exist a matching notification condition, then in operation 425, the second user terminal 130 may output the message (or notification information) corresponding to the notification condition matching the current circumstance information in the form of visual and/or audial information.

In this way, the server 120 can periodically or non-periodically push the messages and notification information registered on the bulletin board to a multiple number of user terminals, after which the user terminal can determine whether or not there are notification conditions that match the current circumstance information and output the messages (or notification information) that correspond to matching notification conditions in the form of visual and/or audial information.

Figure 5:
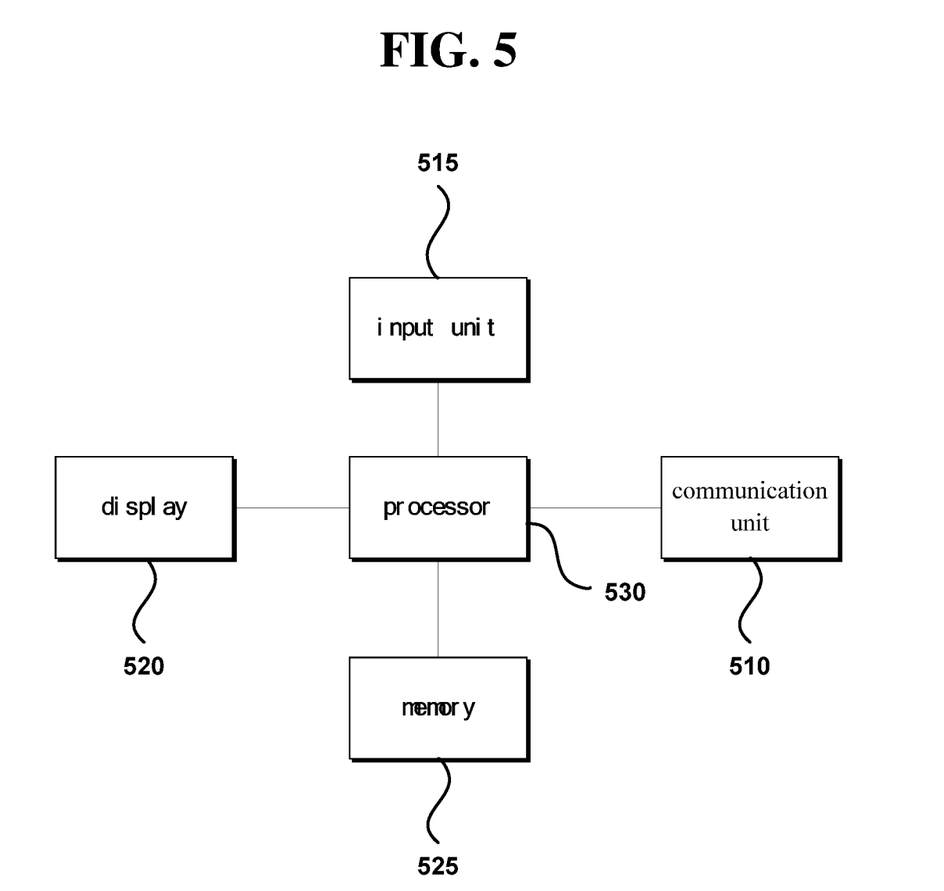
FIG. 5 is a block diagram conceptually illustrating the inner composition of a first user terminal according to a first disclosed embodiment of the invention.

FIG. 5 is a block diagram conceptually illustrating the inner composition of a first user terminal according to a first disclosed embodiment of the invention.

Referring to FIG. 5, a first user terminal 110 according to the first disclosed embodiment of the invention may include a communication unit 510, an input unit 515, a display unit 520, a memory 525, and a processor 530.

The communication unit 510 may serve to transmit and receive data to and from other apparatuses (e.g. the server 120).

In one example, the communication unit 510 can transmit a notification condition and a message to the server 120 in accordance to the control provided by the processor 530.

The input unit 515 may be a device for receiving input from the user such as commands for controlling the first user terminal 110, data, and the like. For example, the input unit 515 can receive the notification conditions and messages as input from the user.

The display unit 520 may be a device for outputting the data inputted by the user.

In one example, the display unit 520 can be a liquid crystal display (LCD).

Although the first disclosed embodiment is illustrated as having the input unit 515 and the display unit 520 as separate components, it is possible to implement the two as a single component such as a touch screen.

The memory 525 may serve to store various applications, data, etc., needed for operating the first user terminal 110.

The processor 530 may serve to control the inner components (e.g. the communication unit 510, input unit 515, display unit 520, memory 525, etc.) of the first user terminal 110 according to the first disclosed embodiment of the invention.

Also, the processor 530 can provide control such that the notification condition and message inputted through the input unit 515 are transmitted via the communication unit 510 to the server 120. Also, if there are no notification conditions or messages inputted through the input unit 515, the processor 530 can provide control such that a guide message guiding the input procedure is outputted separately through the display unit 520.

Although FIG. 5 does not show a separate component for the sensor, the first user terminal can include at least one sensor for acquiring the current circumstance information of the first user terminal. The composition of the sensor may be the same as that described below with reference to FIG. 6 and thus is not described here in further detail.

Figure 6:
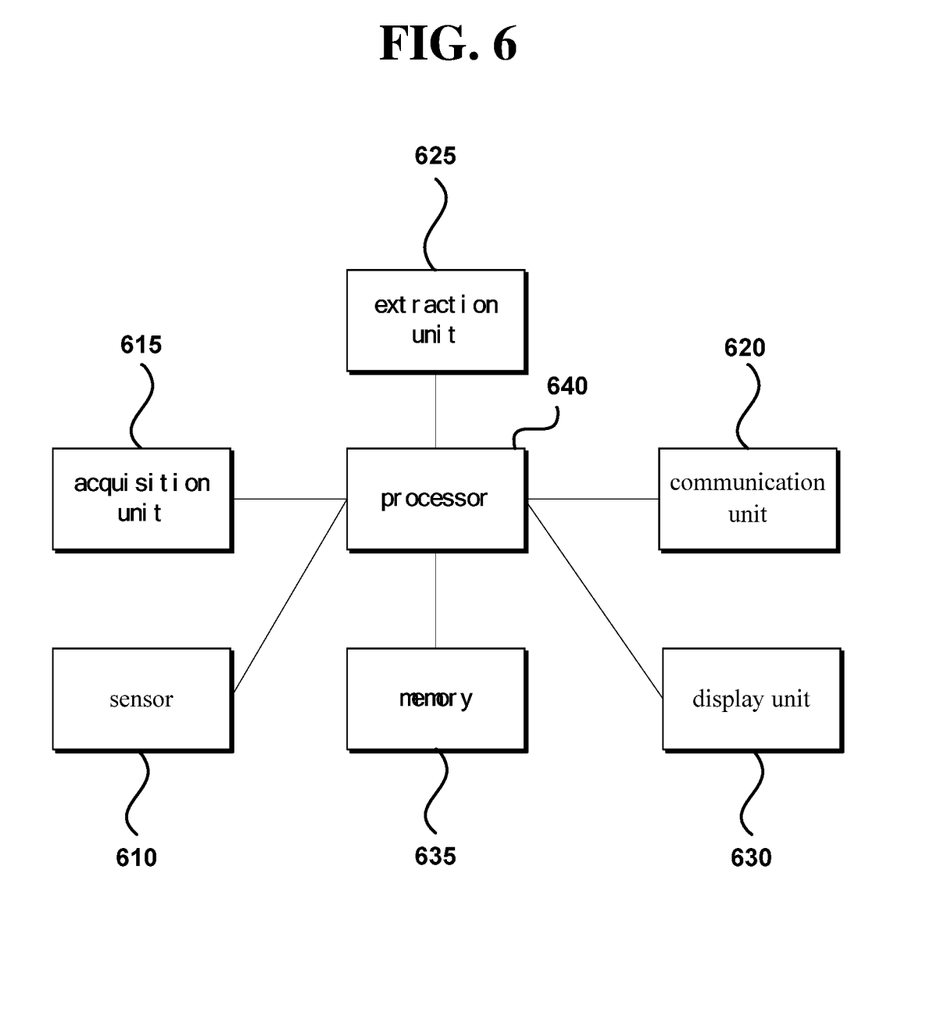
FIG. 6 is a block diagram conceptually illustrating the inner composition of a second user terminal according to a first disclosed embodiment of the invention.

FIG. 6 is a block diagram conceptually illustrating the inner composition of a second user terminal according to a first disclosed embodiment of the invention.

Referring to FIG. 6, the second user terminal 130 according to the first disclosed embodiment of the invention may include a sensor 610, an acquisition unit 615, a communication unit 620, an extraction unit 625, a display unit 630, a memory 635, and a processor 640.

The sensor 610 may be a device for measuring the status of the second user terminal or its user.

In one example, the sensor 610 can include at least one of a GPS device, a gyroscope, an acceleration sensor, a digital compass, a time sensor, a temperature sensor, an illuminance sensor, an altitude sensor, an atmospheric pressure sensor, and a sensor for acquiring biometric information.

The acquisition unit 615 may be a device for acquiring the current circumstance information of the second user terminal 130 or the user by way of the sensor 610.

The current circumstance information of the user is as already described above, and as such, redundant descriptions are omitted here.

The communication unit 620 may be a device for exchanging data between the second user terminal 130 and another apparatus (e.g. the server 120).

In one example, the communication unit 620 can receive from the server 120 at least one message configured to have a notification condition that includes at least spatial information. Here, the communication unit 620 can receive messages from the server 120 periodically or non-periodically.

The extraction unit 625 may serve to extract a message that is configured to have a notification condition matching the current circumstance information, if there exists such a notification condition matching the current circumstance information acquired through the acquisition unit 615.

The display unit 630 may serve to output the message extracted by way of the extraction unit 625. In one example, the display unit 630 can be a liquid crystal display.

The memory 635 may serve to store various algorithms needed for the second user terminal 130 to receive the message notification service, as well as the various data resulting from the procedures involved.

The processor 640 may serve to control the inner components (e.g. the sensor 610, acquisition unit 615, communication unit 620, extraction unit 625, display unit 630, memory 635, etc.) of the second user terminal 130 according to the first disclosed embodiment of the invention.

Also, the processor 640 can delete messages that have been extracted (or selected) by the extraction unit 625 and their corresponding notification conditions.

Also, from among the received messages, the processor 640 can delete messages that have not been selected for a particular duration, deleting the messages along with their notification conditions after said duration has passed. Of course, each message can be configured to have a different continuance duration as well as a different notification condition. In this case, the processor 640 can delete messages of which the continuance duration has expired.

Figure 7:
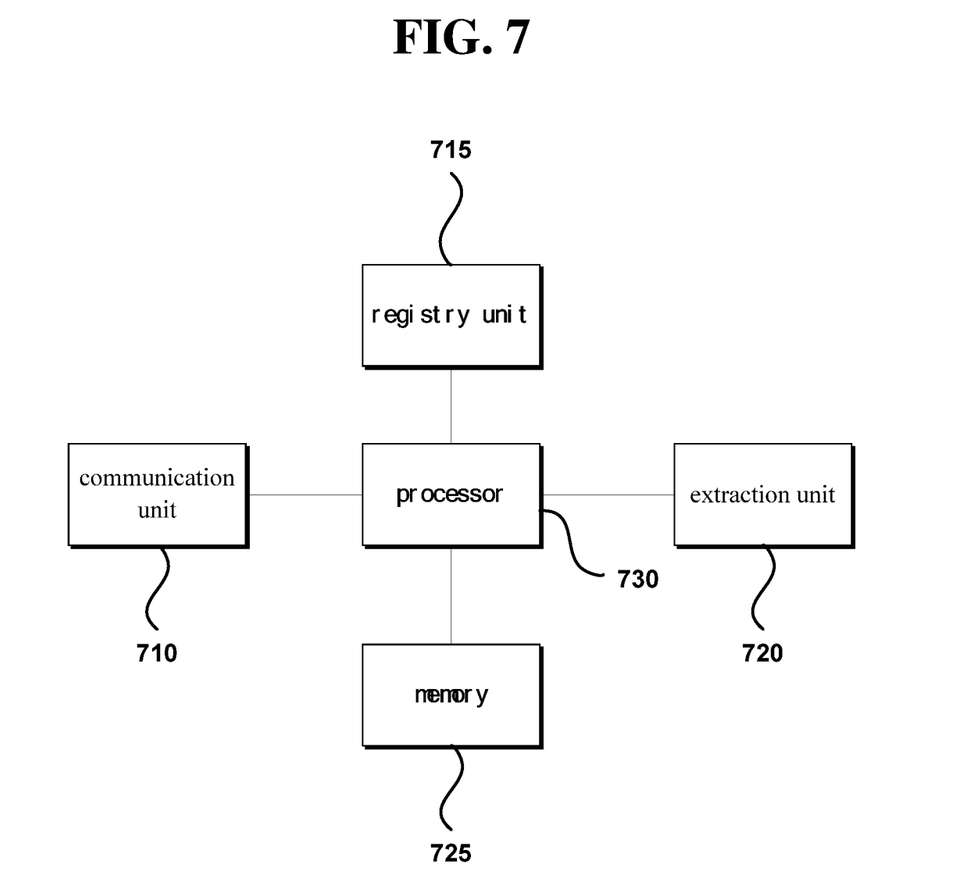
FIG. 7 is a block diagram conceptually illustrating the composition of a server according to a first disclosed embodiment of the invention.

FIG. 7 is a block diagram conceptually illustrating the composition of a server according to a first disclosed embodiment of the invention.

Referring to FIG. 7, the server 120 may include a communication unit 710, a registry unit 715, an extraction unit 720, a memory 725, and a processor 730.

The communication unit 710 may include a receiver unit and a transmitter unit. The receiver unit may serve to receive current circumstance information from the first user terminal 110 or second user terminal 130 or receive messages configured to have notification conditions including spatial information from first user terminals 110.

Also, the transmitter unit may serve to transmit the messages extracted (or selected) according to the control of the processor 730 or the extracted messages and the notification conditions configured for the extracted messages to the first user terminals 110 or second user terminals 130.

The registry unit 715 may serve to register the messages, which have been configured to have notification conditions including at least spatial information and have been received by way of the receiver unit, onto the bulletin board or comment.

The registry unit 715 can register a message to the bulletin board or comment and then configure the notification condition in correspondence with the message.

The extraction unit 720 may extract messages corresponding to matching notification conditions, if such notification conditions exist which match the current circumstance information received through the receiver unit.

Here, the extraction unit 720 may separately store information regarding whether or not a message was extracted and how many times it was extracted, in correspondence with the extracted message, to avoid extracting the same message redundantly or extracting the same message over a designated number of times.

Also, by using identification information regarding user terminals that are permitted to receive a message, where the identification information may be configured separately in correspondence with the message, the extraction unit 720 can extract a message corresponding to a matching notification condition in cases where the user terminal from which the current circumstance information is received is not the user terminal that has sent the message.

Also, the extraction unit 720 can extract messages having notification conditions matching the current circumstance information only for new messages that were registered within a particular duration of time.

Also, after a particular duration has passed, the extraction unit 720 can discard the notification condition configuration for messages that have not been extracted for the notification service, from among the messages configured to have notification conditions. In other words, if a particular duration (e.g. a month, a year, etc.) passes after a new message is registered to a bulletin board or comment, a notification service may not be provided to the user even if the current circumstance of the user comes to match the configured notification condition of the message.

Of course, according to the method of implementation, each message can be configured to have a separate continuance duration or starting time of the notification service, in which case the extraction unit 720 can extract the messages configured with notification conditions matching the current circumstance information only for messages of which the continuance duration or starting time of the notification service is currently valid.

The memory 725 may serve to store various algorithms needed for the server 120 according to the first disclosed embodiment of the invention to provide the message notification service based on spatial information, as well as the various data, applications, etc., associated with the procedures involved.

The processor 730 may serve to control the inner components (e.g. communication unit 710, registry unit 715, extraction unit 720, memory 725, etc.) of the server 120 according to the first disclosed embodiment of the invention.

A method of providing or receiving a message notification service based on spatial information according to an embodiment of the present invention can be implemented in the form of a program of instructions executable by various means of electronically processing information and can be recorded on a storage medium. The storage medium can include program instructions, data files, data structures, etc., or a combination thereof.

Examples of the program of instructions may include not only machine language codes produced by a compiler but also high-level language codes that can be executed by a device for electronically processing information, such as a computer for example, through the use of an interpreter, etc.

The hardware mentioned above can be made to operate as one or more software modules that perform the actions of the embodiments of the invention, and vice versa.

While the spirit of the invention has been described in detail with reference to particular embodiments, the embodiments are for illustrative purposes only and do not limit the invention. It is to be appreciated that those skilled in the art can change or modify the embodiments in various ways without departing from the scope and spirit of the invention.

What is claimed is:

1. A method for providing a message notification service from a server, the method comprising:
   receiving current circumstance information of a user terminal from the user terminal, wherein the user terminal is a terminal of a member who has subscribed to a particular blog or forum;
   determining, based on identification information of the user terminal, that the user terminal is permitted to receive one or more messages;
   responsive to the user terminal being permitted to receive the one or more messages, extracting each message of the one or more messages which has been registered by at least one other user without specifying a recipient, the each message being associated with a notification condition among one or more specified notification conditions for each of the one or more messages matching the current circumstance information, wherein the one or more messages are each associated with the one or more specified notification conditions registered on a bulletin board or comment;
   transmitting the extracted one or more messages to the user terminal based on the notification condition existing; and
   responsive to transmitting the extracted one or more messages, storing the identification information of the user terminal and storing a number of transmissions of the each of the one or more messages to different user terminals, wherein the identification information and the number of transmissions are stored in correspondence with the message,
   wherein the extracting of the message comprises:
       repeatedly extracting each of the one or more messages configured to have the notification condition matching the current circumstance information from among messages newly registered within a particular time, for each different user terminal that has no identification information stored for corresponding messages of the one or more messages and if the number of transmissions of each of the corresponding messages of the one or more messages is within a preset number of transmissions, and
       identifying and excluding from the repeatedly extracting any messages which were previously extracted and are associated with the identification information of the user terminal or has a number of transmissions above a preset number of transmissions, and
   wherein any messages that have not been extracted within a particular time after being newly registered, the notification condition associated with the messages is discarded, and the messages that have not been extracted within the particular time after being newly registered are not transmitted to any of the user terminal and different user terminals.

2. The method for providing a message notification service according to claim 1, wherein the current circumstance information comprises at least two or more of spatial or location information, time information, direction information, inclination information associated with a user manipulation of the user terminal, speed information, applied gravity, illuminance, temperature, atmospheric pressure, and health or biometric information.

3. The method for providing a message notification service according to claim 1, wherein the extracting of the message comprises:
   repeatedly extracting the message configured to have a notification condition matching the current circumstance information from among the messages newly registered within a particular time, if the user terminal from which the current circumstance information is received is not the user terminal to which the message is transmitted or if the number of transmissions of the message is within a preset number of transmissions.

4. The method for providing a message notification service according to claim 1, further comprising, before the receiving of the current circumstance information:
   receiving and registering a message including a notification condition from a registry-permitted user terminal.

5. The method for providing a message notification service according to claim 4, wherein the registry-permitted user terminal and the user terminal are a same terminal.

6. A non-transitory computer-readable recorded medium product having recorded thereon a set of program code for performing the method according to any one of the preceding claims.

7. A server configured to provide a message notification service, the server comprising:
- a memory configured to store program instructions; and
- a processor configured to execute the program instructions, the program instructions when executed configured to:
- receive current circumstance information of a user terminal from the user terminal, wherein the user terminal is a terminal of a member who has subscribed to a particular blog or forum;
- determine, based on identification information of the user terminal, that the user terminal is permitted to receive one or more messages;
- responsive to the user terminal being permitted to receive the one or more messages, extract each message of the one or more messages which has been registered by at least one other user without specifying a recipient, the each message being associated with a notification condition among one or more specified notification conditions for each of the one or more messages matching the current circumstance information, wherein the one or more messages are each associated with the one or more specified notification conditions registered on a bulletin board or comment;
- transmit the extracted one or more messages to the user terminal based on the notification condition existing; and
- responsive to transmitting the extracted one or more messages, store the identification information of the user terminal and a number of transmissions of the each of the one or more messages to different user terminals, wherein the identification information and the number of transmissions are stored in correspondence with the message, wherein each of the one or more messages configured to have the notification condition matching the current circumstance information from among messages newly registered within a particular time is repeatedly extracted, for each different user terminal that has no identification information stored for corresponding messages of the one or more messages and if the number of transmissions of each of the corresponding messages of the one or more messages is within a preset number of transmissions, and any messages that were previously extracted and are associated with the identification information of the user terminal or has a number of transmissions above a preset number of transmissions are identified and excluded from the repeatedly extracting any messages, and wherein any messages that have not been extracted within a particular time after being newly registered, the notification condition associated with the messages is discarded, and the messages that have not been extracted within the particular time after being newly registered are not transmitted to any of the user terminal and different user terminals.

8. The server of claim 7, further comprising:
- a registry configured to receive and register a message including a notification condition from a registry-permitted user terminal.

* * * * *